United States Patent [19]
Pattanaik

[11] Patent Number: 5,815,347
[45] Date of Patent: *Sep. 29, 1998

[54] INFORMATION STORAGE SYSTEM HAVING AN IMPROVED PLANAR HEAD-SUSPENSION ASSEMBLY

[75] Inventor: Surya Pattanaik, San Jose, Calif.

[73] Assignee: International Business Machines Corporation, Armonk, N.Y.

[ * ] Notice: The terminal 20 months of this patent has been disclaimed.

[21] Appl. No.: 246,051

[22] Filed: May 19, 1994

[51] Int. Cl.$^6$ ............................... G11B 5/60; G11B 21/21
[52] U.S. Cl. ............................................ 360/104; 360/103
[58] Field of Search ...................... 360/103, 104

[56] References Cited

U.S. PATENT DOCUMENTS

| | | | |
|---|---|---|---|
| 4,761,699 | 8/1988 | Ainslie et al. | 360/103 |
| 4,788,613 | 11/1988 | Yamashita | 360/123 |
| 4,879,620 | 11/1989 | Yamashita | 360/104 |
| 5,396,390 | 3/1995 | Arakawa et al. | 360/104 |

OTHER PUBLICATIONS

"Method for Slider Attachment and Head Termination to a Suspension in a Disk File", IBM Technical Disclosure Bulletin, vol. 36, No. 02, New York, U.S., Feb., 1993, p. 371.

*Primary Examiner*—Robert S. Tupper
*Attorney, Agent, or Firm*—Douglas R. Millett; Andrew J. Dillon

[57] ABSTRACT

A planar head-suspension assembly for an information storage system is provided. The assembly comprises a planar head being of the type having an air bearing surface and a back side opposite the air bearing surface. The head has a read and/or write transducer formed therein and electrical leads terminating on the back side at termination pads. The assembly also includes a multilayered suspension having an etched conductive lead structure formed in a conductive patterned layer and having one or more openings passing through the suspension. Portions of the conductive lead structure project into the openings, and the back side of the head is placed to the suspension such that the termination pads are properly aligned with the openings. Last, a solder region is formed within each of the openings making electrical contact between the conductive lead structure and the termination pads.

36 Claims, 7 Drawing Sheets

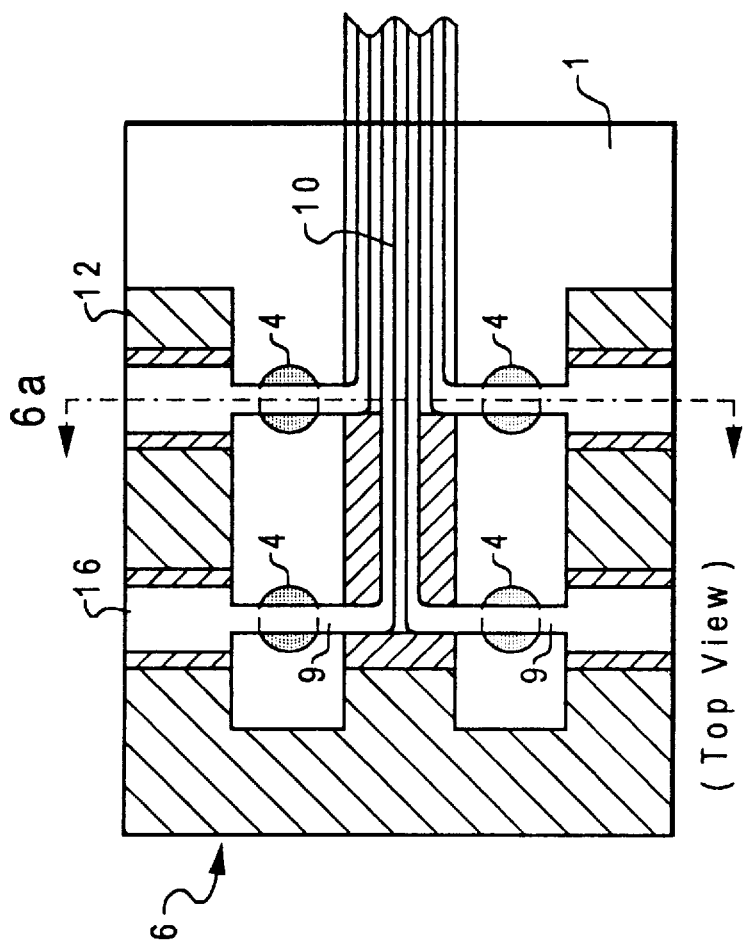
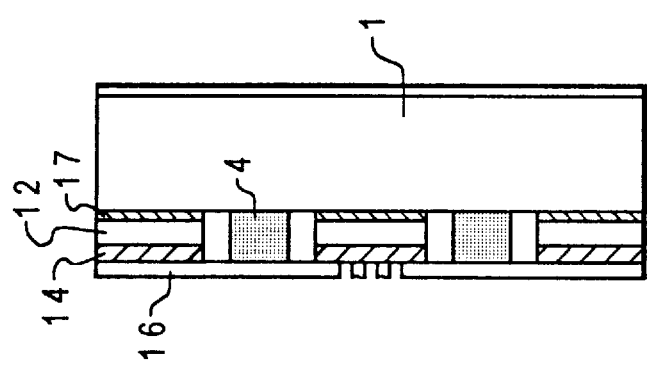
Fig. 6 (b) (Top View)
Fig. 6 (a) (Side Cut View)

Fig. 8 (a)
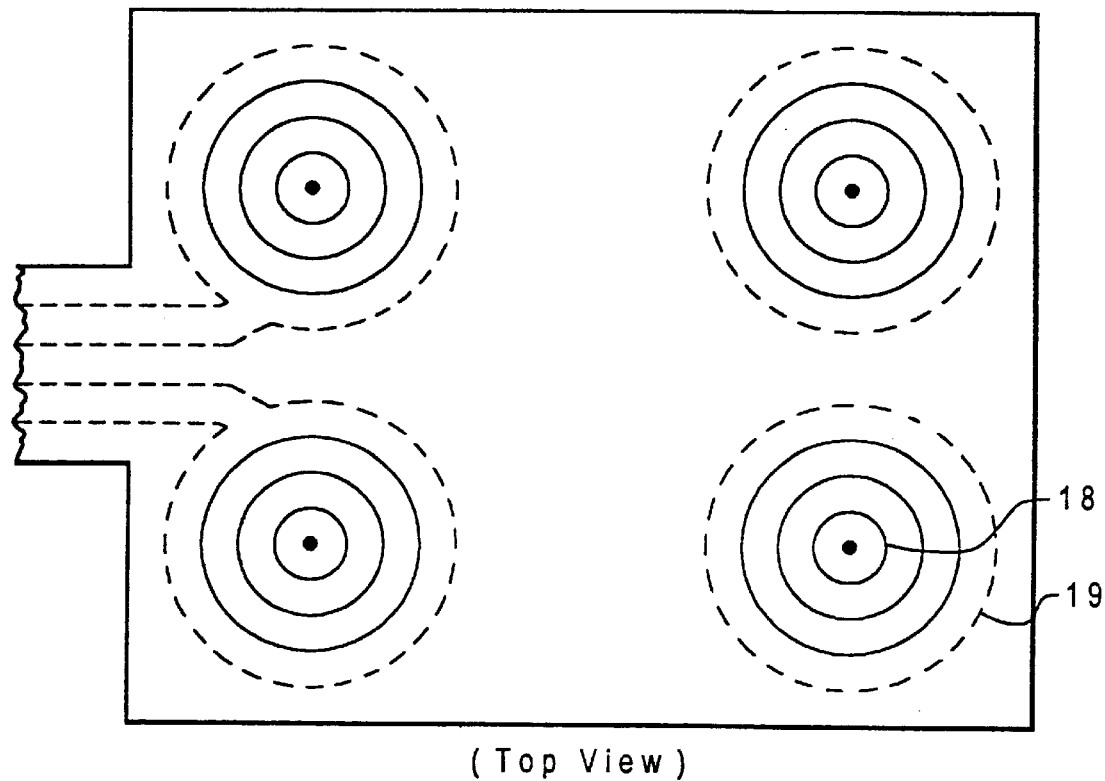
(Top View)
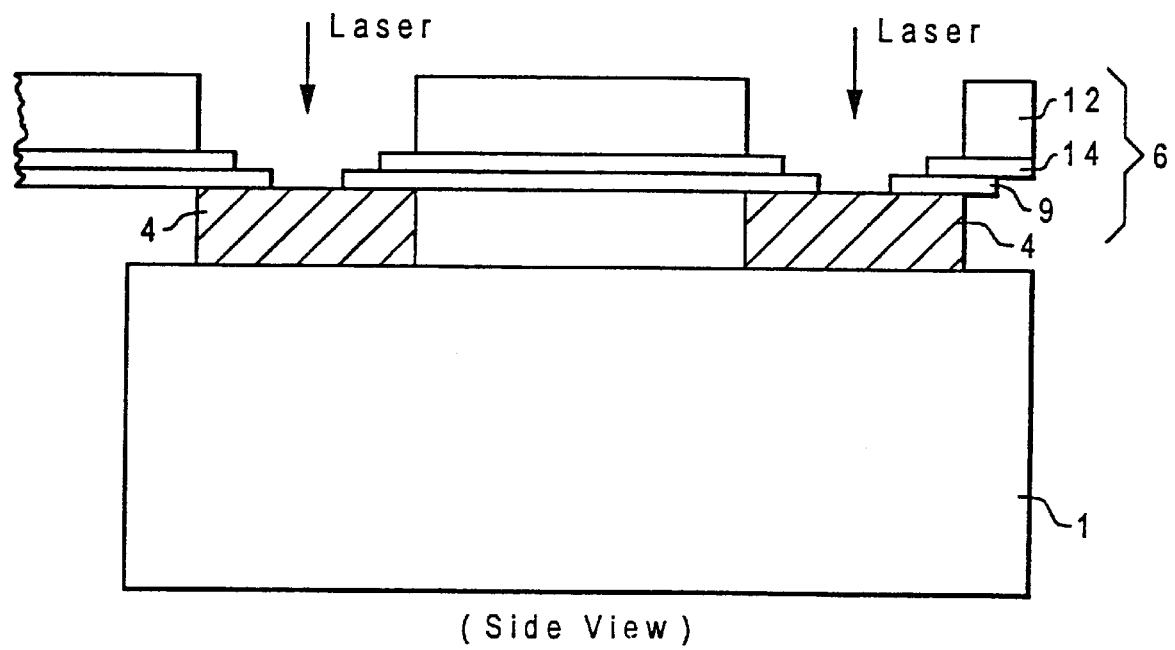
(Side View)
Fig. 8 (b)

INFORMATION STORAGE SYSTEM HAVING AN IMPROVED PLANAR HEAD-SUSPENSION ASSEMBLY

BACKGROUND OF THE INVENTION

1. Technical Field

This invention relates to planar head-suspension assemblies for data recording information storage systems and to a method for making such assemblies. In particular, the invention relates to an improved planar head-suspension assembly for a magnetic storage system and a method for electrically connecting the head to the suspension.

2. Description of the Related Art

Information storage systems, which includes magnetic storage devices and optical data storage systems, utilize at least one rotatable disk with concentric data tracks containing the information, a transducer for reading data from or writing data to the various tracks, and a head positioning actuator connected to a head for moving it to the desired track and maintaining it over the track centerline during read or write operations. The transducer is attached to a head (or "slider") having an air bearing surface which is supported adjacent the data surface of the disk by a cushion of air generated by the rotating disk. The slider is attached on its back side (the side opposite the air bearing surface) to the suspension, and the suspension is attached to an actuator arm of the head positioning actuator.

The suspension provides dimensional stability between the slider and actuator arm, controlled flexibility in pitch and roll motion of the slider relative to its direction of motion on the rotating disk, and resistance to yaw motion. The suspension typically provides a load or force against the slider which is compensated by the force of the air bearing between the slider's air bearing surface and the disk surface. Thus, the slider is maintained in extremely close proximity to, but out of contact with, the data surface of the disk. The suspension typically comprises a load beam, which is mounted at one end to the actuator arm, and a flexure element which is attached to the other end of the load beam and supports the slider. The load beam provides the resilient spring action which biases the slider toward the surface of the disk, while the flexure provides flexibility for the slider as the slider rides on the cushion of air between the air bearing surface and the rotating disk. Such a suspension is described in U.S. Pat. No. 4,167,765, which is assigned to the same assignee as this application. An example of a conventional slider is described in U.S. Pat. No. 3,823,416, which is assigned to the same assignee as this application.

In the conventional slider-suspension assemblies, the slider is mechanically attached to the flexure of the suspension by epoxy bonding. The electrical connection between the transducer and the disk drive read/write electronics is made by twisted wires which run the length of the suspension load beam and extend over the flexure and slider. The ends of the wires are ultrasonically bonded to the transducer leads on the slider. The fabrication of such a slider-suspension requires manual assembly and is thus time consuming and costly.

Another type of suspension is a composite or laminated structure comprising a base layer, a patterned conductive layer with patterned electrical leads formed thereon, and an insulating layer in between, as described in IBM Technical Disclosure Bulletin, Vol. 22, No. 4 (September, 1979), pp. 1602–1603. In this laminated suspension, the slider is epoxy bonded to the laminated suspension and the transducer leads are soldered to the electrical leads formed on the suspension.

Another laminated structure type of suspension is comprised of a base layer of stainless-steel, an insulating layer of polyimide formed on the base layer, and a patterned conductive layer of etched copper alloy formed on the insulating layer, as described in U.S. Pat. No. 4,996,623. The etched copper layer provides a lead structure electrically connecting the thin-film magnetic head transducer with the disk drive's read/write electronics. A method for attaching a slider to a laminated/etched suspension in a data recording disk file has been described in U.S. Pat. No. 4,761,699 and IBM Technical Disclosure Bulletin, Vol. 36, No. 2, February, 1993, p. 371.

There are several disadvantages associated with the slider-suspension assembly process described in U.S. Pat. No. 4,761,699. In order to carry out the process, the etched flat cable on the suspension must undergo further processing to have an insulating passivation layer formed on the cable to prevent shorting between the slider and the cable. Vias must be opened through the passivation layer in order to make electrical contacts with the slider, and solder bumps must be reflowed both for mechanical as well as electrical termination. The slider must also undergo vacuum processing to provide solderable metallized contact pads on the back side of the slider for mechanical attachment. Moreover, the head-suspension assembly must be heated in an infrared belt furnace for reflow of the solder bumps which subjects the slider and MR head to high temperatures. Such a reflow also requires some kind of flux which might induce corrosion on the MR head. An additional step is required to clean off the flux subsequent to the reflow. Additionally, this process is batch type and is not Continuous Flow Manufacturing (CFM) or automated assembly line compatible.

The process described in IBM Technical Disclosure Bulletin, Vol. 36, No. 2, February, 1993, p. 371, uses epoxy for mechanical attachment of the slider. The ends of the copper alloy leads of the suspension are bent up from the surface of the suspension and soldered to the head termination pads using the batch type reflow process. This process brings in a tooling complexity to hold the leads against the solder pads on the slider during the reflow process. In addition, this process has the disadvantages associated with a batch type reflow process as described above.

An advancement in slider design came with the planar thin-film recording head—also known as a horizontal head. The conventional thin-film recording head is made by depositing magnetic films on a ceramic wafer, slicing the wafer into rows, processing the rows to produce an air bearing surface (ABS), and finally, cutting up the rows into sliders. The thin-film layers in such a case are perpendicular to the ABS.

In a typical silicon planar head, the magnetic films are deposited on a silicon wafer. All processing steps are carried out at the wafer level producing a planar silicon head slider where the magnetic film layers are parallel to the ABS surface. The transducer leads are extended to the back surface of the slider through conductive leads deposited in vias or holes. The termination pads are thus located on the back surface of the slider. Such a silicon planar head is easily acquired by those skilled in the art and is manufactured by SILMAG of Grenoble, France.

In addition, a planar head offers great cost advantages to the disk drive manufacturer due to the elimination of complex machining operations needed to create the air bearing surface associated with a conventional slider. This is because the top of the wafer, where the transducer is formed, is used as the air bearing surface of the planar head. Thus, the lapping processes required to form the air bearing surface on conventional sliders is eliminated. Moreover, the planar head process provides transducer termination pads on the flex surface (opposite the ABS) of the slider. Solder bumps can easily be created on this surface at the wafer level by processes such as vapor deposition, electroplating, or solder paste screening and reflow.

Prior art methods of making an electrical connection with the termination pads of a transducer on a planar head have involved using discrete wires that are ultrasonically bonded to the termination pads. However, it would be desirable to provide a multilayered laminated suspension to which the planar head could be attached that would also make an electrical connection from the transducer termination pads to the conductor leads, connecting the thin-film magnetic head transducer and the disk drive read/write electronics.

It would be further desirable to provide a method for fabricating a data recording disk drive planar head-suspension assembly that allows for some tolerance in the alignment of the slider to the suspension when it is mechanically attached, while providing a simple and effective method of making an electrical connection between the thin-film magnetic head transducer and the suspension leads. It would further be desirable to provide a method of soldering the transducer termination pads to the lead pads of an etched copper cable by a process without the use of flux and the need for subsequent cleaning. It would be still further desirable to provide a method of soldering the transducer termination pads to the lead pads of an etched copper cable by a process such that the head and the suspension are not subjected to heat exposure, thus preventing high temperature exposure and magnetic degradation to temperature sensitive components like an MR head. It would be further desirable to provide such a process that does not require a furnace reflow process, thus making the process CFM compatible.

SUMMARY OF THE INVENTION

According to a preferred embodiment of the present invention, a planar head-suspension assembly for an information storage system is provided. The assembly comprises a planar head being of the type having an air bearing surface, and a back side opposite the air bearing surface. The head has a read and/or write transducer formed therein and electrical leads terminating on the back side at termination pads. The assembly also includes a multilayered suspension having an etched conductive lead structure formed in a conductive patterned layer and having one or more openings passing through the suspension. Portions of the conductive lead structure project into the openings, and the back side of the head is placed to the suspension such that the termination pads are properly aligned with the openings. Last, a solder region is formed within each of the openings making electrical contact between the conductive lead structure and the termination pads.

Further, according to a preferred embodiment of the present invention, a method for the fabrication of a data recording information storage system planar head-suspension assembly is provided. The planar head is of the type having an air bearing surface and a back side opposite the air bearing surface. The head has a read and/or write transducer formed therein and electrical leads terminating on the surface of the back side at termination pads covered by solder bumps. The multilayered laminated suspension includes an etched conductive lead structure on a patterned layer and one or more layers overlaying the patterned layer. The method comprising forming a solder bump on each of the termination pads. Then the back side of the head is placed to the suspension such that the termination pads are properly aligned with the conductive lead structure and the solder bumps occupy openings passing through the suspension. The solder bumps are then heated so as to reflow the solder bumps, wherein the reflowed solder bumps make electrical contact between the termination pads and the conductive lead structure.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 depicts the head end of a planar head-suspension assembly, according to a preferred embodiment of the present invention;

FIG. 8 depicts a process for the assembly of the planar head-suspension assembly, according to a preferred embodiment of the present invention.

DETAILED DESCRIPTION OF PREFERRED EMBODIMENT

Figure 1:
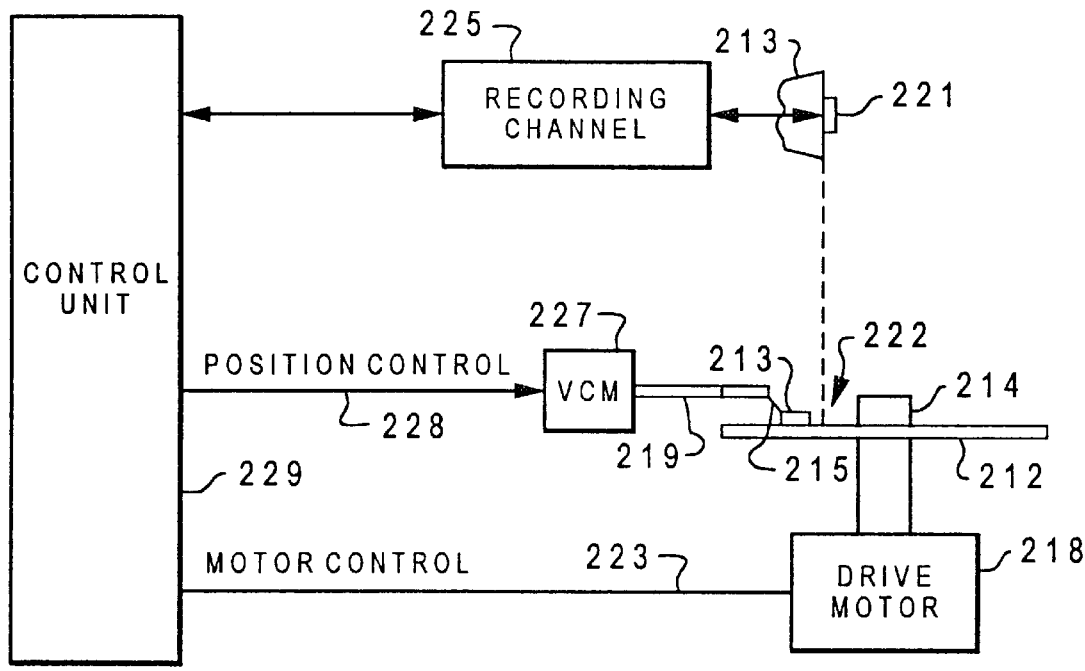
FIG. 1 depicts a magnetic storage system.

Although the present invention is described as embodied in a magnetic disk storage system as shown in FIG. 1, it will be apparent that the invention is also applicable to other information storage systems such as an optical data storage system or a magnetic tape recording system, for example. At least one rotatable magnetic disk 212 is supported on a spindle 214 and rotated by a disk drive motor 218. The magnetic recording media on each disk is in the form of an annular patterned of concentric data tracks (not shown) on disk 212.

At least one slider 213 is positioned on the disk 212, each slider 213 is supporting one or more magnetic read/write heads 221. As the disks rotate, the sliders 213 are moved radially in and out so that the heads 221 may access different portions of the disk surface 222 containing the data. Each slider 213 is attached to an actuator arm 219 by means of a suspension 215. The suspension 215 provides a slight spring force which biases the slider 213 against the disk surface 222. Each actuator arm 219 is attached to an actuator means 227. The actuator means shown in FIG. 1 is a voice coil motor (VCM), but it may also be a stepper motor. The VCM is a coil moveable within a fixed magnetic field, and the direction and velocity of the coil movements is controlled by the current supplied.

During operation of the disk storage system, the rotation of the disk 212 generates an air bearing between the slider 213 and the disk surface 222. The air bearing thus counterbalances the slight spring force of the suspension 215 and supports the slider 213 off the disk surface by a small, substantially constant spacing during operation. Although an air bearing is described with the preferred embodiment, any fluid bearing may be used including an oil lubricant.

The various components of the disk storage system are controlled in operation by signals generated by control and read/write electronics unit 229, such as access control signals and internal clock signals, and which includes logic control circuits, storage means and a microprocessor. The control unit 229 generates control signals to control various system operations such as motor control signals on line 223 and head position control signals on line 228. The control signals on line 228 provide the desired current profiles to optimally move and position a selected slider 213 to the desired data track on the associated disk 212. Read and write signals are communicated to and from read/write heads 221 by means of recording channel 225, which includes conductor lines running along suspension 215 and actuator arm 219.

Figure 2:
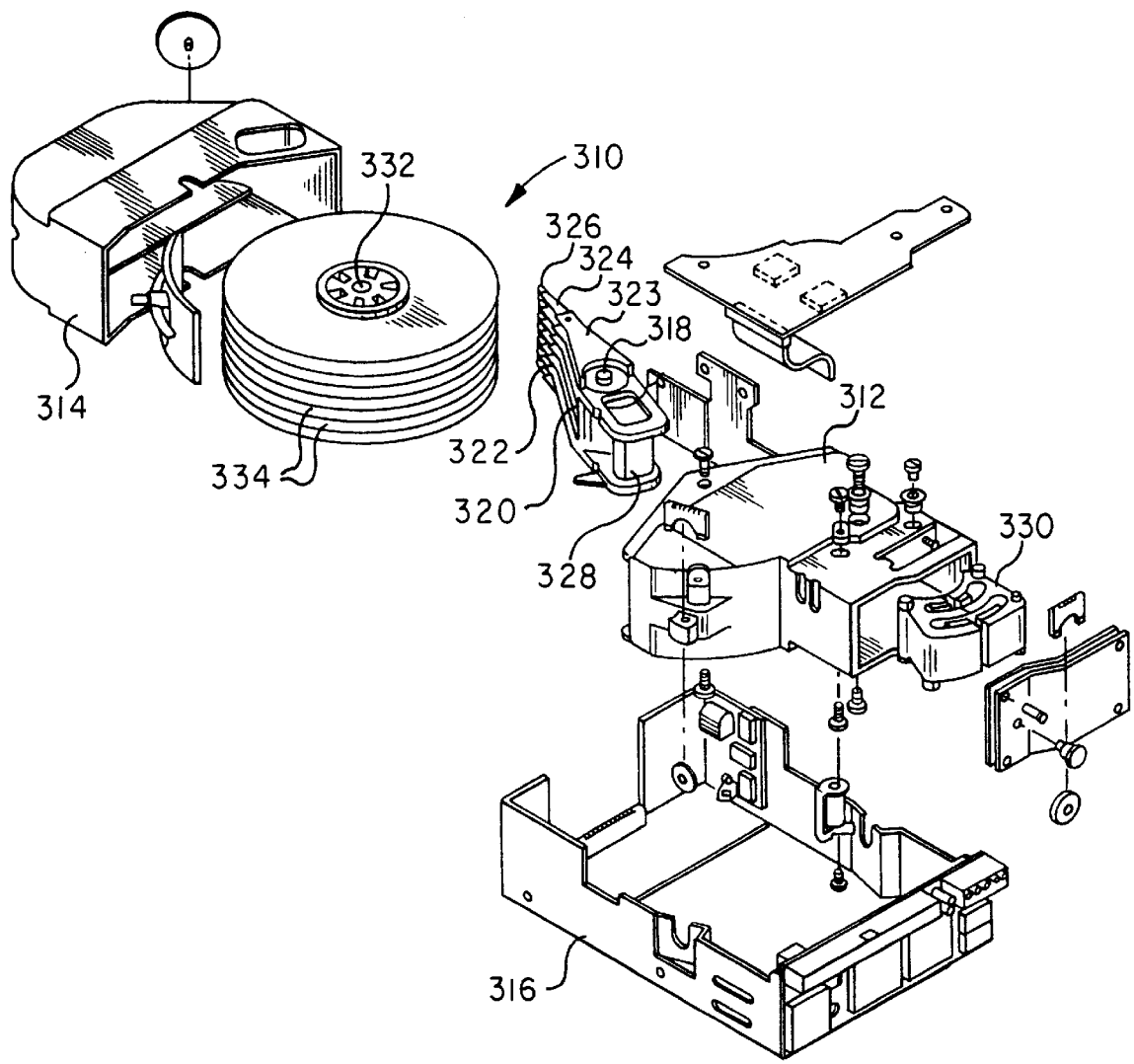
FIG. 2 depicts an exploded view of a disk drive.

The above description of a typical magnetic disk storage system, and the accompanying illustration of it in FIG. 1 are for representation purposes only. The invention described in this application is useful with all mechanical configurations of magnetic storage system disk drives or direct access storage devices ("DASD"). It should be apparent that disk storage systems may contain a large number of disks and actuators, and each actuator may support a number of sliders. For example, FIG. 2 is an exploded view of a disk drive 310. It should be noted that although a rotary actuator is shown, the invention described herein is also applicable to linear actuators. The disk drive 310 includes a housing 312, and a housing cover 314 which, after assembly, is mounted within a frame 316. Rotatably attached within the housing 312 on an actuator shaft 318 is an actuator arm assembly 320. One end of the actuator arm assembly 320 includes an E block or comb like structure 322 having a plurality of actuator arms 323. Attached to the separate arms 323 on the comb or E block 322 are spring suspensions 324. Attached at the end of each spring suspension is a slider 326 which carries a magnetic transducer (not shown in FIG. 2). On the other end of the actuator arm assembly 320 opposite the spring suspensions 324 and the sliders 326 is a voice coil 328.

Attached within the housing 312 is a pair of magnets 330. The pair of magnets 330 and the voice coil 328 are key parts of a voice coil motor which applies a force to the actuator assembly 320 to rotate it about the actuator shaft 318. Also mounted within the housing 312 is a spindle shaft 332. Rotatably attached to the spindle shaft 332 are a number of disks 334. In FIG. 2 eight disks are attached to the spindle shaft 332. The disks 334 are attached to the spindle shaft 332 in spaced apart relation.

The present invention is an information storage system with an improved slider-suspension assembly. For an example of a prior art subassembly, see FIG. 3. The suspension comprises a load beam 100 and a flexure 120 located at the end of load beam 100. The suspension is attached to the disk file actuator arm (not shown) by means of a mounting plate 140. The slider 160 is a conventional slider formed of ceramic material, such as a mixture of alumina ($Al_2O_3$) and titanium carbide (TiC). The slider 160 has an air bearing surface 180, which includes two rails 120, 122, a back side 124 opposite and generally parallel to air bearing surface 180, a leading edge 125 and a trailing edge 126, both of which form end faces oriented generally perpendicular to air bearing surface 180 and back side 124. Slider 160 is secured to flexure 120 by an epoxy bond between back side 124 and flexure 120.

Located on the trailing edge 126 of slider 160 are two thin-film read/write transducers 128, 130. Typically, multiple thin-film transducers are formed on a single slider, even though only one transducer is active as a read/write element, in order to improve the yield of the slider during the thin-film fabrication process. The transducers 128, 130 have pole tips 129, 131, respectively, which extend toward the edge of respective rails 120, 122. Transducer 128 has electrical leads 133, 135 and transducer 130 has electrical leads 137, 139 for connection to the read/write electronics of the disk drive.

Figure 3:
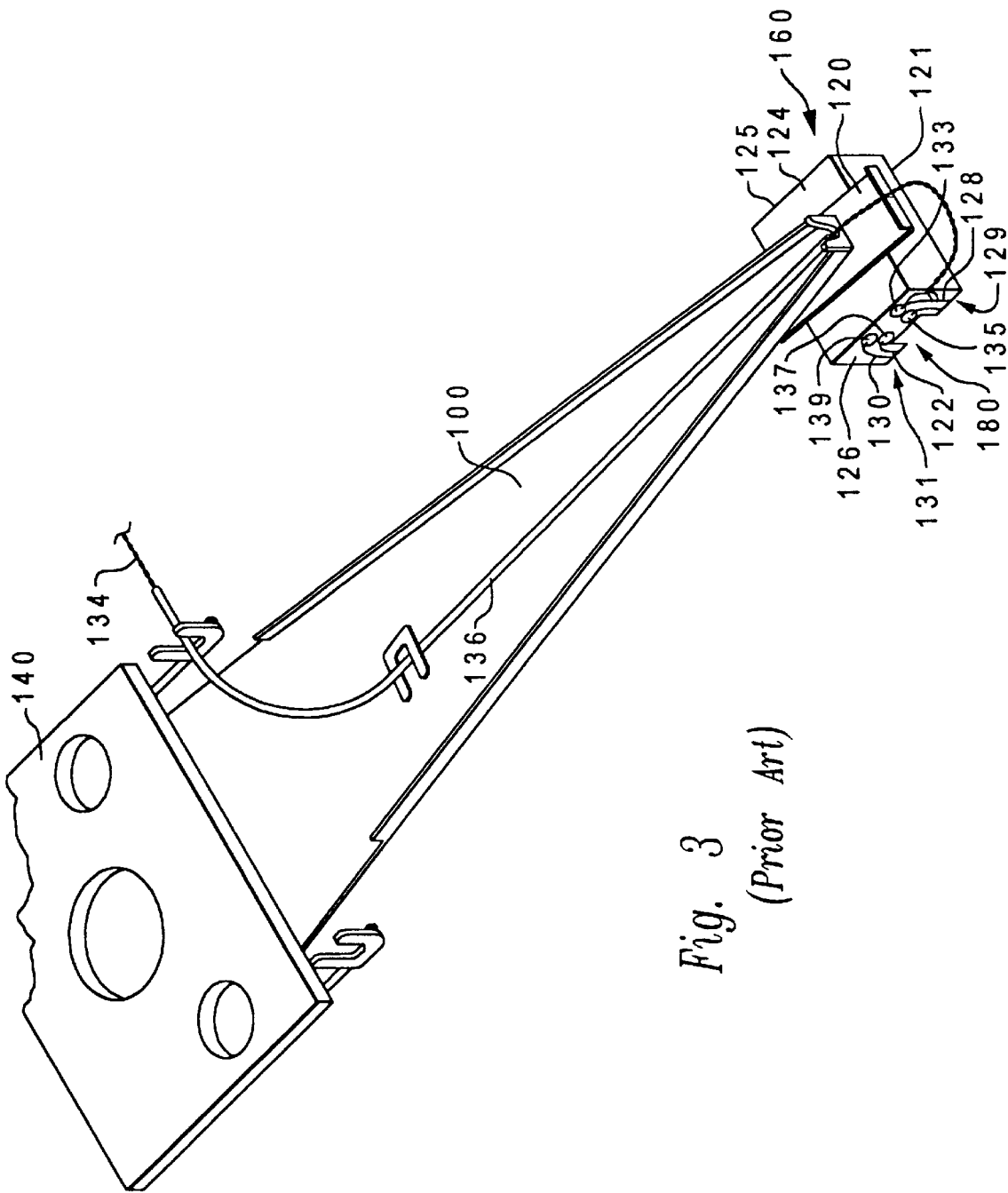
FIG. 3 shows a conventional slider-suspension assembly.

In the prior art suspension shown in FIG. 3, the electrical attachment to the read/write electronics is made by twisted wires 134 which extend from the read/write electronics of the magnetic storage system, through a tube 136 on load beam 100 and out the end of tube 136. The ends of wires 134 are ultrasonically bonded to the leads 133, 135 of active transducer 128. The electrical connection of the transducer 128 by means of the twisted wires 134 is made by manual fabrication.

Figure 4:
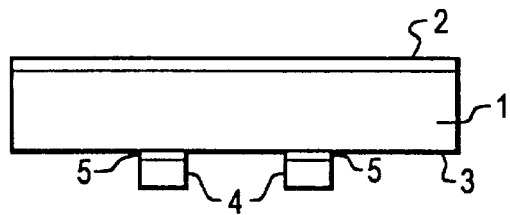
FIG. 4 depicts an elevational side and cross-sectional view of a planar head.
Figure 4:
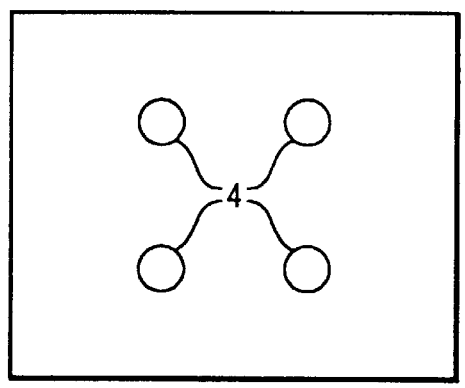
Figure 4:
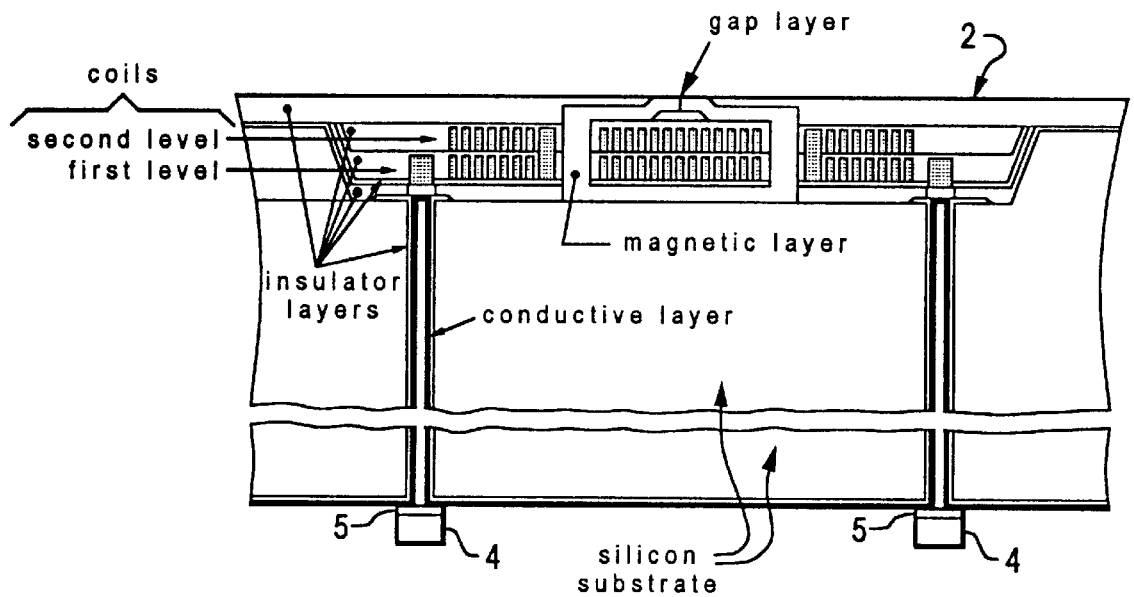

Referring now to FIG. 4, a planar head as used in a preferred embodiment of the present invention is depicted in a top, side and cross-sectional view. Planar head 1 is fabricated using a photolithographic deposition-etching process. The thin-film planar head is formed by depositing magnetic layers on a wafer such as silicon. As seen in the side view, planar head 1 has an air bearing surface 2 and a back side 3. On the air bearing surface 2 of planar head 1, a thin-film transducer is formed. This thin-film transducer may be any type of magnetic transducer including a read/write inductive head, a magnetoresistive (MR) sensor, or an MR head. However, it should be understood that the present invention is not limited in application to magnetic heads, for planar head 1 could contain any type of transducer including an optical or magneto-optical transducer. The pole tips of the transducer extend down to the air bearing surface 2. The conductive leads for the transducer extend through vias to the back side of the slider where they terminate at termination pads 5. Solder bumps 4 are formed on termination pads 5. As seen in the top view, there are four termination pads and corresponding solder bumps; thus, in this example, planar head 1 may contain two transducers or one MR head, for example.

In a preferred embodiment of the present invention, solder bumps 4 are formed in a cylindrical shape with a flattened top. These solder bumps may be formed using several methods. In one method, a 500–1000 Å thick layer of immersion gold is plated over copper termination pads 5. Solder paste, such as a 58% Bl-42% SN, or 63% SN-37% PB, or any other solder alloy suitable for this application, is then screened using a screen printer and the paste is then reflowed in a multi-zone infrared furnace having a nitrogen atmosphere. The solder flux is then cleaned from the wafer. In other methods, the solder is applied to termination pads 5 by electroplating or vapor deposition, both of which are well known by those skilled in the art.

The solder bumps created by electroplating or vapor deposition are naturally formed with flattened tops. The solder bumps which have been created by the reflow method are of a round, generally spherical or hemispherical shape. This is due to the natural tendency of the solder to attain a minimum surface energy upon reflow. Thus, when in a liquid state, the solder will form this natural hemispherical, round shape.

Therefore, after the reflowed solder bumps cool to a solid state, these solder bumps are flattened to a desired height by controlled pressure. This may be accomplished by placing the wafer in a mechanical press which physically smashes or deforms the solder bumps 4 until they achieve a desired height above the back side 3. An alternative method of flattening solder bumps 4 is to place weights over solder bumps 4 and then reflow the solder. Additionally, the flattened solder bumps created by these various methods are selectively flattened. A selectively flattened solder bump is defined herein as a solder bump flattened such that it is not formed in the natural hemispherical shape that the solder bump would attain if liquified upon reflow, and such that the surface of the bump will extend or expand (or contract) radially to attain the natural hemispherical shape. Because the solder bump in this case has been selectively flattened in a plane parallel to the termination pads 5, the surface of the solder bumps will expand along an axis normal to termination pads 5 when returning to its natural hemispherical shape upon reflow. A selectively flattened solder bump, as used in a preferred embodiment, will generally have a maximum dimension along an axis other than one normal to termination pads 5. As can be seen in FIG. 4, selectively flattened solder bumps 4 have a maximum dimension along an axis parallel to the surface of the termination pads 5.

Figure 5:
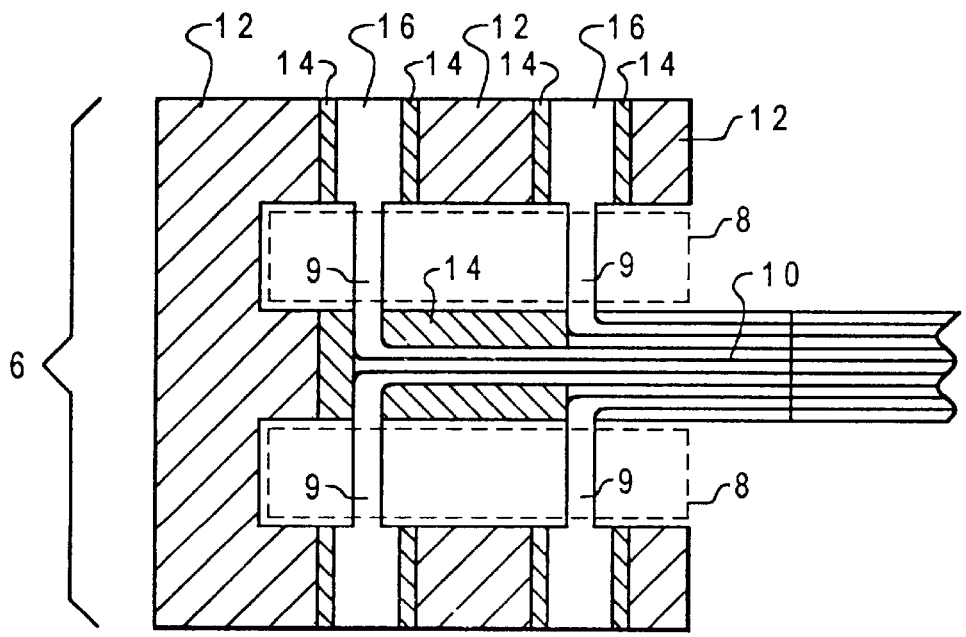
FIG. 5 depicts a multilayered laminated suspension, according to a preferred embodiment of the present invention.

Referring now to FIG. 5, there is depicted a preferred embodiment of the multilayered suspension of the present invention. Suspension 6 comprises a base layer 12, an insulating layer 14 formed on the base layer 12, and a patterned conductive layer 9, 10, 16 formed on the insulating layer 14. The base layer 12 may be a stainless steel layer. The insulating layer 14 may be a polyimide layer. The patterned conductive layer 9, 10, 16 comprises an etched conductive lead structure formed from a copper film. Alternatively, the multilayered suspension 6 could be formed as an etched flex cable containing the conductive lead structure that is bonded to a stainless steel base layer.

In the embodiment shown in FIG. 5, the bundle of conductor leads 10 travel the length of the suspension 6 and make connection (not shown) to actuator arm-electronics termination pads or an electronics package mounted to the actuator arm that delivers signals to the disk drive read/write electronics. The bundle of conductor leads 10 are formed on an insulating layer 14 of polyimide and a base layer 12 of stainless steel which provides structural support. At the end of the suspension 6, depicted in FIG. 5, the suspension is configured to receive a planar head and make electrical and mechanical connection such that the planar head-suspension assembly may be utilized in a magnetic storage system or other information storage system.

The bundle of conductive leads 10 fan out in copper strips 9 which end at contacts 16. The spacing and sizing of openings 8 are configured such that when a planar head is mounted on suspension 6, strips 9 will be aligned with the termination pads of the planar head. Openings 8 are formed in the suspension by removing (or never forming) the base layers underneath the conductive patterned layer 9, 10, 16, wherein the base layers in the preferred embodiment are the insulating layer 14 of polyimide and the base layer 12 of stainless steel. Thus, portions of the conductive lead structure, in this case strips 9, project out into the openings of the suspension. In this embodiment, strips 9 traverse the entire opening 8. In alternative embodiments, however, the portions of the conductive lead structure projecting into the openings do not have to completely traverse the openings. Also, in alternative embodiments, additional layers may be formed on top of the patterned conductive layer, for example to provide protection to the conductive lead structure, which either partially or fully cover the openings. Moreover, conventional conductive lines such as twisted wire pairs may be used to make the connection from strips 9 to the read/write electronics.

Referring now to FIG. 6, there is depicted a preferred embodiment of the planar head-suspension assembly of the present invention. The back side of planar head 1 is mechanically attached to suspension 6. A layer of adhesive or epoxy 17 bonds the back side 3 of planar head 1 to stainless steel base layer 12. Planar head 1 has been aligned with suspension 6 such that solder bumps 4 are positioned directly under strips 9. As can be seen in the side cut view of FIG. 6(*a*), the solder bumps 4 occupy the openings passing through the suspension and are formed such that their height from the back side of slider 1 is equal to the total thickness of the layers formed underneath the patterned layer 9, 10, 16. Thus, solder bumps 4, which are formed on termination pads 5 of a transducer formed within planar head 1, reflow to electrically connect with the conductive lead structure. In this way, solder bumps 4 create a solder region within each of the openings 8 that makes electrical contact between the conductive lead structure and the termination pads.

To ensure a solid electrical connection, solder bumps 4 are heated to cause them to reflow and draw to strip 9. Solder bumps 4 are preferably heated by a laser beam focused and shined through the openings in the suspension, while being flooded by a flow of nitrogen gas. In the embodiment shown in FIG. 6, the laser would be shined at an angle from above the suspension to hit the solder bumps. The laser beam is produced from a YAG laser which is focused and shined at each of the solder bumps 4. The power can vary depending on the volume of the solder bump or the melting point of the solder. Typically, the process will require approximately 400 mJ.

By using a laser beam to reflow the solder bumps, the preferred embodiments of the present invention avoid many of the disadvantages of the prior art. The focused laser beam provides localized heating and thus prevents temperature sensitive components such as an MR head from being exposed to high temperatures. These high temperatures degrade the magnetic properties of such sensitive devices. Moreover, such localized heating produces a stress-free solder joint as neither the slider nor the suspension is subjected to heat exposure. Another significant advantage is that this process eliminates the use of flux in the reflow process. This eliminates the additional processing step required to clean the flux from the slider-suspension assembly subsequent to reflow. Another advantage to the laser reflow process is that because of its rapid heating and cooling, a metallurgically superior solder joint of very fine grain size and low intermetallics is created. Last, unlike the furnace reflow process, this is a Continuous Flow Manufacturing (CFM) compatible process that can be incorporated into automated assembly lines. While the preferred embodiment discloses utilizing a laser reflow process, it is understood that conventional reflow methods, such as heating in an infrared belt furnace, may also be used to practice the present invention.

In the preferred embodiment, the width of the strips 9 are smaller than the diameter of the solder column. In an alternative embodiment, the strips 9 can be as wide or wider than the solder columns 4, but they have a small hole at their center through which the laser beam can shine and reach the solder column, causing reflow.

The electrical connection of planar head 1 to suspension 6 is further promoted if solder bumps 4 are selectively flattened solder bumps. In this case, the surface of the selectively flattened solder bumps 4 will expand along an axis normal to the back side of planar head 1 upon reflow. Using this embodiment, the manufacturing process is simplified and tolerances are loosened because solder bumps 4 are not required to be exactly the height of the layers underneath the conductive patterned layer and in contact with the conductive lead structure. Because of the natural tendency of the selectively flattened solder bump to return to its natural hemispherical shape upon reflow, the solder bumps will, in essence, grow out from the termination pads to make the electrical connection with the strips 9, wherein the solder bumps will tend to flow up and around strips 9 making a more effective and solid electrical connection. Additionally, it is possible that the solder bump-strip connections will have sufficient structural strength to act as the mechanical attachment of planar head 1 to suspension 6, thus removing the need for adhesive 17.

Figure 7:
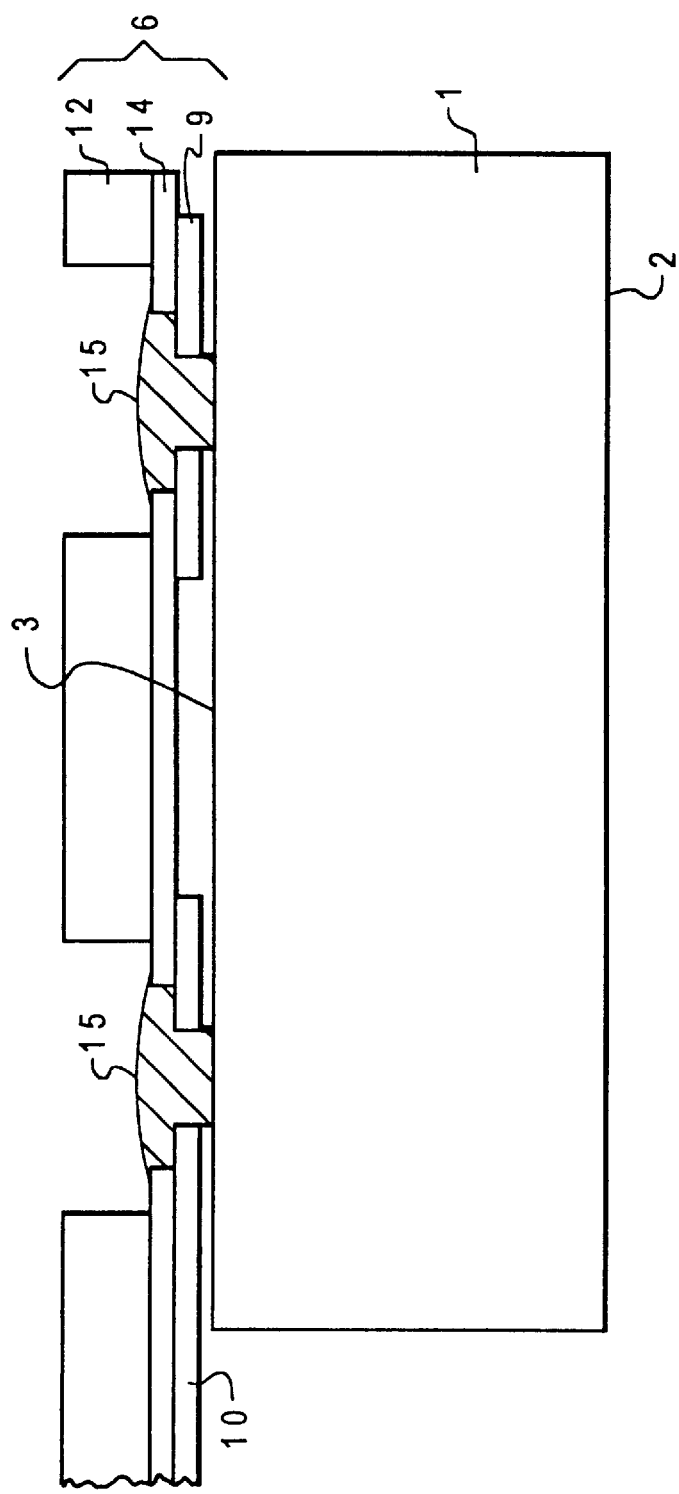
FIG. 7 depicts the head end of a planar head-suspension assembly, according to a preferred embodiment of the present invention.

An alternative preferred embodiment of the present invention is depicted in FIG. 7. The planar head 1 has its back side 3, opposite the air bearing surface 2, placed in contact with the conductive patterned layer 9 of a multilayered suspension 6, wherein, for example, suspension 6 comprises conductive patterned layer 9 formed in copper, insulating layer 14 formed in polyimide, and base layer 12 formed in stainless steel. As seen in FIG. 7, conductive patterned layer 9 has been etched to form a conductive lead structure for transmitting signals along the suspension. In this embodiment, conductive lead structure 10 is etched in conductive patterned layer 9 to provide conductor leads that transmit signals from the planar head's transducer to the disk drive read/write electronics.

Solder regions 15 are connected to termination pads 5 located on the back side of planar head 1 and extend through holes in conductive layer 9 to form on conductive layer 9 and insulating layer 14. This makes an electrical connection between the planar head termination pads 5 and the conductive patterned layer 9. According to a preferred embodiment of the present invention, solder regions 15 are of sufficient strength to create "rivet" type mechanical attachment of planar head 1 to suspension 6. Thus, the manufacture of the planar head-suspension assembly is further simplified by the present invention. In one manufacturing step, the planar head may be electrically and mechanically attached to the suspension by a solder reflow process. The process for producing this preferred embodiment of the present invention can best be explained with reference to FIG. 8.

A top view and cut-away side view of a planar head and a multilayered suspension during the fabrication of a planar head-suspension assembly is shown in FIG. 8. The planar head 1 has solder bumps 4 formed on termination pads located on its back side. Planar head 1 is placed in contact with suspension 6, wherein suspension 6 comprises conductive layer 9, insulating layer 14 and base layer 12. The back side of planar head 1 is placed in contact with the conductive patterned layer 9 such that solder bumps 4 are properly aligned with the corresponding contact pads of the conductive lead structure etched in conductive patterned layer 9. These contact pads can best be seen in the top view of FIG. 8. In this embodiment, there are four solder connections to be made. The four contact pads of suspension 6 are formed in the conductive copper layer 9 and extend from the inner edge 18 to the outer edge 19 for all four contact pads. (The outer edge 19 is drawn in dashed lines because it is hidden in the top view.)

Solder bumps 4 are then heated by a laser, such as a YAG, by focusing and shining the laser beam through the openings in suspension 6 onto solder bumps 4, as shown in the side view of FIG. 8. With the appropriate amount of pressure between planar head 1 and suspension 6, solder will flow through the holes in conductive patterned layer 9 and into the openings of suspension 6. The use of selectively flattened solder bumps in this embodiment further promotes the flow of solder through the holes in conductive patterned layer 9 because of its tendency to expand in a direction normal to the back side upon reflow. The resulting structure from this process is that shown in FIG. 7, wherein the resulting solder regions 15 provide both electrical contact between the conductive lead structure and the termination pads, and mechanical attachment of the planar head to the suspension.

Therefore, the present invention provides an improved planar head-suspension assembly for an information storage system that allows a planar head to be simply mounted on a multilayered suspension. Solder regions are formed within openings in the suspension that make electrical contact between a conductive lead structure and termination pads on the head. Moreover, the present invention improves manufacturing efficiency and yield by facilitating automated production. The openings in the suspension allow soldering to be achieved by a fluxless laser reflow process that provides local heating of the solder and does not affect heat sensitive transducer components. Also, the use of selectively flattened solder bumps in the fabrication of the planar head-suspension assembly loosens manufacturing tolerances. Further, the present invention provides a planar head-suspension assembly where the electrical connections also provide mechanical attachment, thereby eliminating a manufacturing process step.

While the invention has been particularly shown and described with reference to a preferred embodiment, it will be understood by those skilled in the art that various changes in form and detail may be made therein without departing from the spirit and scope of the invention.

I claim:

1. A head-suspension assembly for an information storage system, comprising:
   a head having a read and/or write transducer formed therein and electrical leads terminating at termination pads;
   a suspension having a conductive lead structure and having one or more openings passing through the suspension, portions of the conductive lead structure projecting into the openings, and the head being placed in contact with the suspension such that the termination pads are properly aligned with the openings; and
   a solder region within each of the openings making electrical contact between the conductive lead structure and the termination pads.

2. A head-suspension assembly according to claim 1, wherein the planar head is placed in contact with a layer on the suspension other than the conductive patterned layer.

3. A head-suspension assembly according to claim 1, wherein the planar head is attached to the suspension by epoxy bonding.

4. A head-suspension assembly according to claim 1, wherein the solder regions make sufficient contact with the termination pads and the suspension that the connection provides mechanical attachment of the head to the suspension.

5. A head-suspension assembly according to claim 4, wherein the solder regions extend from the openings through holes in the conductive patterned layer to make contact with the termination pads, and further wherein the holes are smaller than the openings so that the portion of the solder regions occupying the openings are larger than the hole, such that the head is mechanically attached to the suspension by the solder regions.

6. A head-suspension assembly according to claim 1, wherein the suspension is a multilayered laminated suspension.

7. A head-suspension assembly according to claim 6, wherein the suspension comprises a multilayered laminated structure having a base layer, an insulating layer formed on the base layer, and a patterned conductive layer formed on the insulating layer.

8. A head-suspension assembly according to claim 7, wherein the base layer is stainless steel, the insulating layer is a polyimide, and the conductive layer is a copper alloy.

9. A head-suspension assembly according to claim 1, wherein the suspension is an etched flex cable bonded to a base layer, and further wherein the conductive patterned layer is the flex cable.

10. A head-suspension assembly according to claim 1, wherein the transducer is a magnetic transducer and the information storage system is a magnetic storage system.

11. A head-suspension assembly according to claim 10, wherein the magnetic transducer is an inductive transducer.

12. A head-suspension assembly according to claim 10, wherein the transducer is an MR head.

13. A head-suspension assembly according to claim 10, wherein the planar head has a magnetic transducer formed as a thin film therein having pole tips at the air bearing surface.

14. A head-suspension assembly according to claim 1, wherein the solder region is created by a selectively flattened bump extending along an axis normal to the back side upon reflow.

15. An information storage system comprising:
  a storage medium having a plurality of tracks for recording of data;
  a head having a read and/or write transducer formed therein and electrical leads terminating at termination pads;
  a suspension having conductive lead structure and having one or more openings passing through the suspension, portions of the conductive lead structure projecting into the openings, and the head being placed in contact with the suspension such that the termination pads are properly aligned with the openings, the suspension maintaining the transducer in a closely spaced position relative to the storage medium during relative movement between the transducer and the storage medium;
  a solder region within each of the openings making electrical contact between the conductive lead structure and the termination pads;
  actuator means coupled to the suspension for moving the transducer to selected tracks on the storage medium; and
  means coupled to the suspension lead structure for reading signals transmitted by the transducer representative of data bits recorded in the information storage medium.

16. An information storage system according to claim 15, wherein the coupled means provides signals to the transducer for writing data bits in the storage medium.

17. An information storage system according to claim 15, wherein the coupled means receives signals from the transducer that represent data bits recorded in the information storage medium.

18. An information storage system according to claim 15, wherein the planar head is placed in contact with a layer other than the conductive patterned layer.

19. An information storage system according to claim 15, wherein the solder regions make sufficient contact with the termination pads and the suspension that the connection provides mechanical attachment of the head to the suspension.

20. An information storage system according to claim 14, wherein the solder regions extend from the openings through holes in the conductive patterned layer to make contact with the termination pads, and further wherein the holes are smaller than the openings so that the portion of the solder regions occupying the openings are larger than the hole, such that the head is mechanically attached to the suspension by the solder regions.

21. An information storage system according to claim 15, wherein the suspension is a multilayered laminated suspension.

22. An information storage system according to claim 21, wherein the suspension comprises a multilayered laminated structure having a base layer, an insulating layer formed on the base layer, and a patterned conductive layer formed on the insulating layer.

23. An information storage system according to claim 22, wherein the base layer is stainless steel, the insulating layer is a polyimide, and the conductive layer is a copper alloy.

24. An information storage system according to claim 15, wherein the suspension is an etched flex cable bonded to a base layer, and further wherein the conductive patterned layer is the flex cable.

25. An information storage system according to claim 15, wherein the transducer is a magnetic transducer and the information storage system is a magnetic storage system.

26. An information storage system according to claim 25, wherein the magnetic transducer is an inductive transducer.

27. An information storage system according to claim 25, wherein the transducer is an MR head.

28. An information storage system according to claim 25, wherein the planar head has a magnetic transducer formed as a thin film therein having pole tips at the air bearing surface.

29. An information storage system according to claim 25, wherein the coupled means detects resistance changes in a magnetoresistive material residing in the transducer responsive to magnetic fields representative of data bits recorded in the information storage medium intercepted by the layer of magnetoresistive material.

30. A multilayered suspension suitable for use in a head-suspension assembly for an information storage system, comprising:
  a support;
  a conductive lead structure contained in a conductive patterned layer formed over the support; and
  one or more openings passing through the support, wherein portions of the conductive lead structure project into the openings, and further wherein the openings are configured to allow the alignment of portions of the conductive lead structure with termination pads of a head for connection via a solder region therebetween.

31. A multilayered suspension according to claim 30, wherein the portions of the conductive lead structure are strips of the conductive patterned layer traversing the openings.

32. A multilayered suspension according to claim 30, wherein the portions of the conductive lead structure project around the perimeter of the openings such that holes are formed in the conductive patterned layer that are smaller than the openings.

33. A multilayered suspension according to claim 30, wherein the suspension is a multilayered laminated suspension.

34. A multilayered suspension according to claim 33, wherein the suspension is formed as a multilayered laminated structure comprising a base layer, an insulating layer formed on the base layer, and a patterned conductive layer formed on the insulating layer.

35. A multilayered suspension according to claim 34, wherein the base layer is stainless steel, the insulating layer is polyimide, and the conductive layer is a copper.

36. A multilayered suspension according to claim 30, wherein the suspension is an etched flex cable bonded to a base layer, and further wherein the conductive lead structure is contained in the flex cable.

* * * * *

UNITED STATES PATENT AND TRADEMARK OFFICE
CERTIFICATE OF CORRECTION

PATENT NO. : 5,815,347
DATED : September 29, 1998
INVENTOR(S) : Pattanaik

It is certified that error appears in the above-identified patent and that said Letters Patent is hereby corrected as shown below:

Column 12, Line 8: Please change "claim 14" to --claim 19--

Signed and Sealed this

Second Day of March, 1999

Attest:

Attesting Officer

Q. TODD DICKINSON

Acting Commissioner of Patents and Trademarks